Patented Aug. 29, 1944

2,357,254

UNITED STATES PATENT OFFICE 2,357,254

MANUFACTURE OF CATALYSTS

Joseph D. Danforth, Chicago, Ill., assignor to Universal Oil Products Company, Chicago, Ill., a corporation of Delaware No Drawing. Application April 30, 1941, Serial No. 391,129

8 Claims. (Cl. 252—251)

This application is a continuation-in-part of my co-pending application Serial No. 353,893, filed August 23, 1940 now Patent No. 2,339,248, dated Jan. 18, 1944.

The present invention relates to improved catalysts suitable for accelerating reactions among hydrocarbons, more particularly reactions involving the formation of gasoline boiling range hydrocarbons of high antiknock value. More specifically, it has reference to a method for manufacturing refractory catalytic materials which are effective in selectively promoting the formation of high antiknock gasoline from relatively heavy petroleum fractions. The catalysts are also applicable to conversion reactions involving single hydrocarbons, synthetically produced hydrocarbon mixtures, or primary distillates produced in the destructive distillation of hydrocarbon containing material such as coals, lignites and shales.

Knowledge regarding preparation of catalysts and their application to hydrocarbon conversion reactions, especially the cracking of higher boiling hydrocarbons to produce gasoline, is in the same state as in many other catalytic fields, that is, a knowledge relative to the complex reactions involved is scant and definite information concerning catalysts which substantially retain their activity under the high temperatures employed and their method of preparation is very meager. It is generally known, however, that cracking catalysts can be used for only a relatively short period of time because of the rapid accumulation of hydrocarbonaceous materials upon their active surfaces. The hydrocarbonaceous deposits are usually removed by oxidation at high temperature in the presence of oxygen-containing gases to restore the catalyst activity. In order to meet commercial requirements as a cracking catalyst for example, any proposed material must withstand a relatively large number of these regenerations without much loss in the initial activity. It is among the objects of the invention to supply a rugged and refractory catalyst for hydrocarbon conversion reactions suitable for prolonged use in commercial practice and to produce catalysts which are characterized by a high selectivity in accelerating gasoline reactions while depressing carbon and gas-forming reactions.

In one specific embodiment the present invention comprises an improvement in the manufacture of catalysts suitable for use in hydrocarbon conversion reactions to produce large yields of gasoline of high antiknock value which comprises impregnating formed particles of a refractory cracking catalyst with boric acid which is added through the medium of a solution in a glycerine-water mixture, the acid being absorbed into the pores and onto the surface of the particles and later dehydrated to leave a residue of boric oxide which exerts desirable promoting effects.

The catalysts to which boric oxide is added in accordance with the present process may be of either natural or synthetic origin. Naturally occurring siliceous materials such as many earths, clays, glauconites (greensand), bentonites, and montmorillonites which are usually chemically treated to give useful catalysts may be utilized, or permutites and other active materials including certain phosphates of aluminum, zirconium, and titanium. Synthetic catalysts subject to the present process and having usefulness in organic reactions include various compositions of hydrated silica with hydrous oxides such those of aluminum, zirconium, magnesium, titanium, vanadium, beryllium, and other metal oxides. Numerous methods may be employed in preparing the synthetic cracking catalysts which are further impregnated with boric oxide according to the present invention. The components may be precipitated separately, concurrently or consecutively.

In a type of cracking catalyst particularly amenable to improvement by addition of boric oxide, the primary and major component is a precipitated hydrated silica which is usually admixed with a precipitated hydrous metal oxide such as alumina, zirconia or mixtures thereof, present in minor proportions. According to one general method of preparation of such catalysts, the hydrated silica may be precipitated from a dilute solution of commercial water glass and subsequently admixed with the remaining hydrated oxide components. The hydrated silica may be admixed with the hydrated oxide components in any suitable manner, as for example by suspending the precipitated hydrated silica in a solution of a metal salt and precipitating a hydrated oxide in the presence of the suspended hydrated silica by the addition of a suitable alkaline precipitant. Various other procedures may be followed wherein these components may be co-precipitated or separately precipitated and the components intimately mixed. The hydrated silica may also be heated in solutions of the metal salts and hydrated oxides deposited in the presence of a hydrated silica by hydrolysis, or the precipitated hydrated silica may be mixed with a relatively concentrated solution of the metal salt to form a paste and then heated to deposit the desired metal oxides. The mixed materials are usually dried at ordinary drying temperatures and reduced to a small mesh size and formed into shaped and sized particles. According to other procedures it is possible to extrude the catalytic material while in a wet condition and subsequently dry the moist particles to obtain them in the desired form.

In the manufacture of such synthetic catalysts for repeated use it has been found necessary, where sodium compounds have been adsorbed into the catalytic material during preparation, to treat the material at some state of its preparation in order to remove these alkali metal impurities. This may be accomplished by washing with various acid and salt solutions before or after drying. The purified material may be extruded as a gel or it may be dried and then admixed with a lubricant to facilitate forming of the particles and prevent sticking in briquetting or pilling machines. After forming into particles, the material is then finally calcined. Whatsoever the method of compositing the hydrated oxides constituting the cracking catalyst and subsequent procedures in consolidating and forming into particles, such particles may be improved according to the present invention by adding boric oxide although not necessarily with equivalent results when the oxide is added to differently prepared catalysts.

In accordance with the present invention hydrocarbon conversion catalysts of either natural or synthetic origin are treated with glycerin-water solutions of boric acid by any mode of operation which would result in the addition of boric acid to pre-formed particles. Thus for example particles of catalyst may be suspended in a relatively concentrated solution of boric acid in a glycerin-water mixture to permit the absorption of the solution, a bed of particles may be impregnated with boric acid by passing a similar solution through the bed, or the solution may be mixed with formed particles or powdered catalyst particles and the solution evaporated to leave a residue of the desired boric acid. The impregnated particles are then further heated to dehydrate boric acid and develop boric oxide on the active surfaces.

The concentration of boric oxide on the catalyst surfaces may be controlled by varying the concentration and amount of the solutions of the impregnating boron compound. Catalysts containing approximately 2 to 8% of boric oxide by weight of the catalyst have been found to be particularly desirable, and higher proportions of the boric oxide up to 15% or more may be employed.

Although the mechanism of the present process whereby boric oxide is added to prepared hydrocarbon conversion catalysts may be referred to as a simple dehydration of boric acid to form boric oxide on the catalyst, it is realized that the high solubility of boric acid in the presence of glycerine is probably due to the formation of a glyceryl borate, which after absorption on the catalyst undergoes complex decomposition on heating to deposit boron as the oxide or the meta acid depending on the temperature of the calcination. Also it is probable that at least part of the boric oxide deposited is chemically combined with the alumina and/or the zirconia to form a complex catalytic material. There is little doubt that some chemical reaction does occur, since there is a definite evolution of heat when moist alumina or zirconia gel are mixed with boric acid. Ordinarily when zirconia and boric oxide are mixed and heated, a very hard brittle material is formed which possesses the properties of neither ingredient.

One of the main advantages of the present process for adding boric oxide to prepared hydrocarbon conversion catalyst is that a boric acid is preferably added to previously calcined and formed materials which are then only moderately heated to temperatures usually not in excess of 600° C. to complete the incorporation of the desired boric oxide. If boric oxide from any source is added at some point in the preparation of such catalysts as silica-alumina, silica-zirconia, or silica-alumina-zirconia catalysts prior to their calcination at temperatures of the order of from about 800 to about 900° C. there is apparently a tendency toward fluxing or glazing so that instead of obtaining catalyst composites of increased activity and decreased carbon forming tendencies due to the addition of the boric oxide, there is actually a decrease in activity probably due to loss of porosity and contact surface. The present method of adding boric oxide is preferably practiced on a prepared composite hydrocarbon conversion catalyst which has been previously calcined to produce a catalyst of optimum or maximum activity prior to the addition of the boric oxide, although beneficial effects are noted when prepared catalysts of lesser activities are treated.

When synthetic silica-alumina and/or zirconia catalysts both with and without boric oxide have been employed in cracking reactions it has been observed that under comparable conditions smaller amounts of carbonaceous deposits and gaseous products have been obtained for a given yield of gasoline when using catalysts impregnated with boric oxide according to the present invention. Due to the smaller amounts of carbonaceous deposits present the time required to regenerate the catalyst is substantially reduced and plant capacity is accordingly increased.

The preferred catalysts may be conveniently utilized in carrying out various types of hydrocarbon conversion reactions when employed as filling material in tubes or they may be disposed in trays or in chambers. The average size of the particles may vary within the approximate range of 4 to 10 mesh. A hydrocarbon oil fraction is usually heated to substantially reaction temperature and the vapors contacted with the stationary catalyst masses. The hydrocarbon vapors may be passed downward through the catalyst, and where large beds of catalyst are involved the passage of vapors may be restricted to definite paths rather than allowing the vapors to have unrestricted contact with the large beds of catalytic material. Where this method is used, the temperature of the contact materials while in use and during regeneration may be controlled by various operating procedures or by heat interchange devices. After the oil vapors have passed over the catalyst as in catalytic cracking for example, the products may be separated into high boiling fractions which are not to be further cracked and/or insufficiently converted fractions which may be subjected to further cracking treatment and the gasoline and gaseous products. The higher boiling fractions may be removed from the system, may be returned directly to admixture with the charging stock, or may be separately processed so as to ultimately obtain maximum utilization of the charging stock in producing the gasoline product.

The following examples are introduced to illustrate the methods of manufacture and the use of catalysts prepared in accordance with the present invention without the intent, however, of limiting the invention in the exact correspondence with the data presented.

EXAMPLE I

A catalyst was prepared by compositing 100 mols of silica and 5 mols of zirconia and pilling to produce 1/8" x 1/8" cylinders or pills using 2% stearic acid and 4% flour as lubricants. The pills were calcined at about 800° C. for several hours. 150 parts by weight of the so calcined pills were treated with 175 parts by weight of an aqueous solution containing 16.8 parts by weight of boric acid and 35 parts by weight of glycerin. The pills were heated before this treatment to 110° C. and the solution was heated to 90° C. After the addition of the boric acid solution the pills were dried at 120° C. and calcined at 500° C. in a slow stream of air for one hour.

Using the catalyst prepared as above and a similarly prepared silica-zirconia catalyst without boric oxide, comparative cracking runs were made on a Pennsylvania gas oil to show the improved results obtained with the present catalyst. The comparative runs were made at a temperature of 932° F., a pressure of 15 pounds per square inch and a liquid space velocity of 4 volumes of liquid per hour per volume of catalyst space. The runs were made over a period of 6 hours in both cases wherein the catalyst activity dropped slightly and the yields of gasoline and carbon are averaged for the period of operation.

*Comparative cracking runs*

|  | Silica-zirconia catalyst | Silica-zirconia-boric oxide catalyst |
|---|---|---|
| Vol. percent gasoline | 26.8 | 29.6 |
| Carbon percent of charge | 0.12 | 0.10 |

EXAMPLE II 150 parts by weight of the same type of pelleted catalyst indicated in Example I were treated at 110° C. with 150 parts by weight of a solution containing 12 parts by weight of boric acid and 17 parts by weight of glycerin. The impregnated pills were dried at 120° C. and then heated in a slow stream of air for two hours at 500° C.

Comparative cracking runs were again made to show the improved results obtained with catalyst prepared as above, compared with a silica-zirconia catalyst without boric oxide. The runs were made under the same conditions as in Example I, and the table below indicates the results obtained.

*Comparative cracking runs*

|  | Silica-zirconia catalyst | Silica-zirconia-boric oxide catalyst |
|---|---|---|
| Vol. percent of gasoline | 26.6 | 29.9 |
| Carbon percent of charge | 0.12 | 0.10 |

I claim as my invention:

1. A process for the manufacture of an improved catalyst suitable for use in hydrocarbon conversion reactions which comprises impregnating a synthetically prepared hydrocarbon conversion catalyst which has been calcined at a temperature above 600° C. but not substantially in excess of 900° C. with a glycerin-water solution of boric acid, evaporating said solution and heating to incorporate a boron compound into the catalyst.

2. A process for the manufacture of an improved catalyst suitable for use in hydrocarbon conversion reactions which comprises impregnating a synthetically prepared silica-containing hydrocarbon conversion catalyst which has been calcined at a temperature above 600° C. but not substantially in excess of 900° C. with a glycerin-water solution of boric acid, evaporating said solution and heating to incorporate a boron compound into the catalyst.

3. A process for the manufacture of an improved catalyst suitable for use in hydrocarbon conversion reactions which comprises impregnating a synthetically prepared silica-containing hydrocarbon conversion catalyst which has been calcined at a temperature above 600° C. but not substantially in excess of 900° C. with a glycerin-water solution of boric acid, evaporating said solution and heating at a temperature of from about 400 to about 600° C.

4. A process for the manufacture of an improved catalyst suitable for use in hydrocarbon conversion reactions which comprises impregnating a synthetically prepared silica-alumina hydrocarbon conversion catalyst which has been calcined at a temperature above 600° C. but not substantially in excess of 900° C. with a glycerin-water solution of boric acid, evaporating said solution and heating at a temperature of from about 400 to about 600° C.

5. A process for the manufacture of an improved catalyst suitable for use in hydrocarbon conversion reactions which comprises impregnating a synthetically prepared silica-zirconia hydrocarbon conversion catalyst which has been calcined at a temperature above 600° C. but not substantially in excess of 900° C. with a glycerin-water solution of boric acid, evaporating said solution and heating at a temperature of from about 400 to about 600° C.

6. A process for the manufacture of an improved catalyst suitable for use in hydrocarbon conversion reactions which comprises impregnating a synthetically prepared silica-alumina-zirconia hydrocarbon conversion catalyst which has been calcined at a temperature above 600° C. but not substantially in excess of 900° C. with a glycerin-water solution of boric acid, evaporating said solution and heating at a temperature of from about 400 to about 600° C.

7. A process for the manufacture of an improved catalyst suitable for use in hydrocarbon conversion reactions which comprises impregnating a calcined hydrocarbon conversion catalyst of the naturally occurring siliceous clay type which has been calcined at a temperature above 600° C. but not substantially in excess of 900° C. with a glycerin-water solution of boric acid, evaporating said solution and heating at a temperature of from about 400° C. to about 600° C.

8. A process for the manufacture of an improved catalyst suitable for use in hydrocarbon conversion reactions which comprises impregnating a calcined hydrocarbon conversion catalyst of the acid-treated naturally occurring siliceous clay type which has been calcined at a temperature above 600° C. but not substantially in excess of 900° C. with a glycerin-water solution of boric acid, evaporating said solution and heating at a temperature of from about 400° C. to about 600° C.

JOSEPH D. DANFORTH.